US005601684A

United States Patent [19]

Shiga

[11] Patent Number: 5,601,684

[45] Date of Patent: Feb. 11, 1997

[54] METHOD FOR MANUFACTURING AN ION FLOW ELECTROSTATIC RECORDING HEAD

[75] Inventor: Naohito Shiga, Tokyo, Japan

[73] Assignee: Olympus Optical Co., Ltd., Tokyo, Japan

[21] Appl. No.: 115,427

[22] Filed: Sep. 1, 1993

[30] Foreign Application Priority Data

| | | | |
|---|---|---|---|
| Sep. 3, 1992 | [JP] | Japan | 4-235895 |
| Jan. 18, 1993 | [JP] | Japan | 5-006009 |

[51] Int. Cl.[6] .......... B32B 31/14

[52] U.S. Cl. .......... 156/278; 156/272.2; 156/643.1; 156/89; 427/123; 347/123

[58] Field of Search .......... 427/79, 96, 98, 427/123; 347/123, 125; 156/278, 89, 643.1, 272.2; 264/60

[56] References Cited

U.S. PATENT DOCUMENTS

| | | | |
|---|---|---|---|
| 4,241,103 | 12/1980 | Ohkubo et al. . | |
| 4,622,240 | 11/1986 | Yext et al. | 427/96 |
| 4,820,547 | 4/1989 | Lindsay et al. | 427/98 X |
| 4,958,172 | 9/1990 | McCallum et al. . | |
| 5,403,650 | 4/1995 | Baudrand et al. | 427/98 X |

FOREIGN PATENT DOCUMENTS

| | | | |
|---|---|---|---|
| 61-185879 | 8/1986 | Japan . | |
| 2-153760 | 6/1990 | Japan . | |
| 4-161360 | 6/1992 | Japan | 347/123 |
| 4-161358 | 6/1992 | Japan | 347/123 |
| 4-232766 | 8/1992 | Japan | 347/123 |
| 5-221012 | 8/1993 | Japan | 347/123 |
| WO82/00723 | 3/1982 | WIPO . | |

*Primary Examiner*—David A. Simmons
*Assistant Examiner*—M. Curtis Mayes
*Attorney, Agent, or Firm*—Frishauf, Holtz, Goodman, Langer & Chick, P.C.

[57] ABSTRACT

A method for manufacturing an ion flow electrostatic recording head including: a plurality of first electrodes extending in parallel to one another on an insulating substrate; a plurality of second electrodes intersecting the plurality of first electrodes to form a matrix and having openings at positions corresponding intersections of the matrix; and a dielectric layer interposed between the plurality of first and second electrodes. The plurality of the first and second electrodes jointly constitute ion generating portions arranged in a matrix pattern. The method includes: (a) forming a conductive film on the dielectric layer which constitutes a multilayer structure on the insulating substrate together with the first electrodes; and applying a plating to the conductive film to form the plurality of second electrodes, the plating including applying a nickel chemical plating to the conductive film and applying an electroless plating thereto.

13 Claims, 3 Drawing Sheets

METHOD FOR MANUFACTURING AN ION FLOW ELECTROSTATIC RECORDING HEAD

BACKGROUND OF THE INVENTION

1. Field of the Invention

The present invention relates to an ion flow electrostatic recording head used in electrostatic printing, copying, and the like, and a method for manufacturing the same.

2. Description of the Related Art

An electrostatic recording apparatus is generally used in, for example, electrostatic printing. This apparatus generates ions having a high current density by discharging high-frequency pulses. These ions are selectively supplied to a chargeable member, constituted by an insulator to charge the member, and then form a latent image thereon by an electrostatic charge. Powders (toners) are scattered on the member, which have an electrostatic charge whose polarity is opposite to that of the electrostatic charge of the latent image, thereby visualizing the latent image.

An ion flow electrostatic recording head used in the above electrostatic recording apparatus has the following structure. A plurality of first electrodes each formed of a long conductor are arranged in parallel on one surface of a sheet-like dielectric layer, and a plurality of second electrodes each formed of a long conductor are arranged on the other surface thereof. These first and second electrodes intersect each other to form a matrix. Ion generating holes are formed in those portions of the second electrodes which intersect the first electrodes.

An insulating layer is formed on the surfaces of the second electrodes which are opposite to the dielectric layer, and a sheet-like third electrode is formed on the insulating layer. A large number of ion current flowing openings are formed in the insulating layer and the third electrode. These ion current flowing openings are arranged so as to communicate with the holes formed in the second electrodes.

when the ion flow electrostatic recording head is operated, any one of the intersections between the first and second electrodes can be selected in response to a printing signal. A high voltage is applied between the first and second electrodes in correspondence with the selected intersection, with the result that positive and negative ions are generated in the vicinity of that hole of the second electrode which corresponds to the intersection.

Furthermore, a bias voltage is applied between the second and third electrodes. Only the ion, which depends upon the polarity of the bias voltage, is selected from the positive and negative ions generated near the opening of the second electrode. The selected ion is transmitted through the ion current flowing opening and then to a chargeable member which is spaced away from the third electrode, thereby partially charging this member. Consequently, electrostatic recording can be performed in the form of dots by selectively driving the electrodes constituting a matrix.

In general, a dielectric material for forming the dielectric layer necessitates such an insulating strength as not to cause a dielectric breakdown even when a high voltage is applied for ion generation. Since the dielectric layer requires such a thickness as to generate ions efficiently and withstand a dielectric breakdown, it is desirable that the dielectric layer should have a high dielectric constant.

For example, Jpn. Pat. Appln. KOKAI Publication No. 2-153760 discloses an ion flow electrostatic recording head wherein a dielectric layer is formed by mixing a powder of titanium oxide into silicone denatured polyester alkyd resin. Further, the second electrodes, which are constituted by foil of stainless steel, are fixedly adhered to the dielectric layer using a silicone type pressure sensitive adhesive.

The process of manufacturing the ion flow electrostatic recording head includes a heating step and a mechanical folding step following the step of fixedly adhering the second electrodes to the dielectric layer. In the heating and folding steps, a thermal stress or a mechanical stress are applied to each of the components constituting the recording head. Also, while the recording head is being operated, heat generates from the whole of the head, and a thermal stress is applied to each of the components of the head. The thermal or mechanical stress is concentrated on the least cohesive portion of the components of the recording head, e.g., a fixing portion between the second electrode and the dielectric layer.

However, the silicone type pressure sensitive adhesive of Jpn. Pat. Appln. KOKAI Publication No. 2-153760 is strong in peeling but weak in shearing. For this reason, when the silicone type pressure sensitive adhesive is used to fix the second electrode to the dielectric layer, it does not withstand the shear force due to the thermal or mechanical stress generated in the heating step, in the folding step, or in using the recording head. Thus, the first and second electrodes may shift away from each other after the second electrode is fixed to the dielectric layer, resulting in the degradation of an image formed by the recording head.

The area of each second electrode contacting the surface of the dielectric layer is very small, only several square millimeters. It is thus necessary to use a special adhesive having a high adhesiveness in order to fix the second electrodes and the dielectric layer by only the adhesion of the adhesive without causing any shift between them and to withstand the thermal and mechanical stresses in the heating and folding steps and in using the recording head. The use of such an adhesive increases the manufacturing cost.

Since several thousands of small ion generating holes each having a diameter of about 100 μm are formed in the second electrode, it is very difficult to apply an adhesive to portions other than the holes. Furthermore, an unnecessary adhesive has to be removed from inside the holes by washing the contact portions between the second electrodes and the dielectric layer, which is a complicated operation.

Since it is difficult to completely remove the adhesive attached to all the holes formed in the second electrodes using only a washing operation, the adhesive may remain locally inside the holes. In contrast, an indispensable adhesive may peel off the periphery of each of the holes of those sides of the second electrodes which are adhered to the dielectric layer and the metal surface may thus be exposed. Since the current density of the exposed metal surface, which contributes to discharge, differs from that of the portion covered with the adhesive, the amounts of ions generated from the holes differ, one from another, and it is difficult to form an image having uniform quality by using the recording head and to have uniform durability of all the second electrodes.

A high-level etching technique is required to uniformly make the numerous holes in the second electrode of stainless foil with high precision. In this respect, the manufacturing cost of the recording head is increased.

SUMMARY OF THE INVENTION

The present invention has been developed in consideration of the above situation and its object is to provide an ion flow electrostatic recording head and a method for manufacturing the same which is capable of firmly adhering the second electrodes and dielectric layer to each other, preventing the electrodes from being shifted due to thermal and mechanical stresses and deterioration of the recording head with age, and having a uniform amount of ions generated through openings of the second electrodes, and which improves in image quality and durability and decreases in cost.

In order to attain the above object, there is provided an ion flow electrostatic recording head including a plurality of first electrodes extended in parallel to each other on an insulating substrate, a plurality of second electrodes intersecting the first electrodes to form a matrix and having openings at intersections of the matrix, and a multilayer structure having a dielectric layer interposed between the first and second electrodes, the first and second electrodes having ion generating portions arranged in a matrix, the ion flow electrostatic recording head further comprising means for firmly adhering the first and second electrodes to the multilayer structure, without using an adhesive.

According to the present invention, the second electrodes and the dielectric layer can be firmly adhered to each other by the adhering means without using any adhesive, the electrodes can be prevented from being shifted due to thermal and mechanical stresses and deterioration of the recording head with age, and an amount of ions generated through openings of the second electrodes can be uniformed, thereby improving in image quality and durability and decreasing in cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1A:
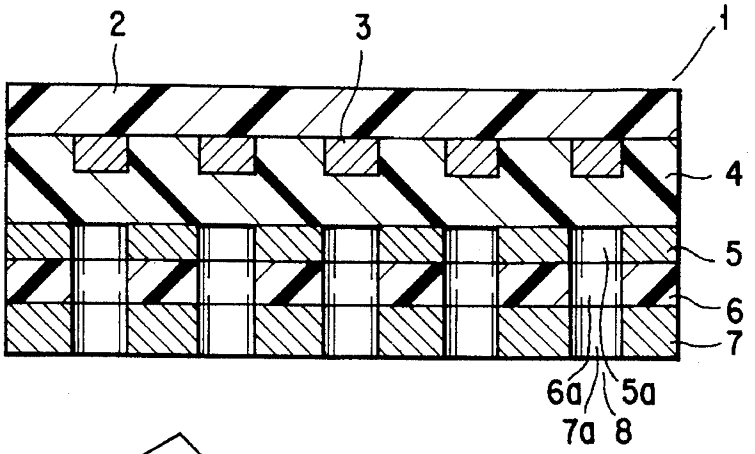
FIG. 1A is a vertical sectional view schematically showing a constitution of the main part of an ion flow electrostatic recording head according to a first embodiment of the present invention.
Figure 1B:
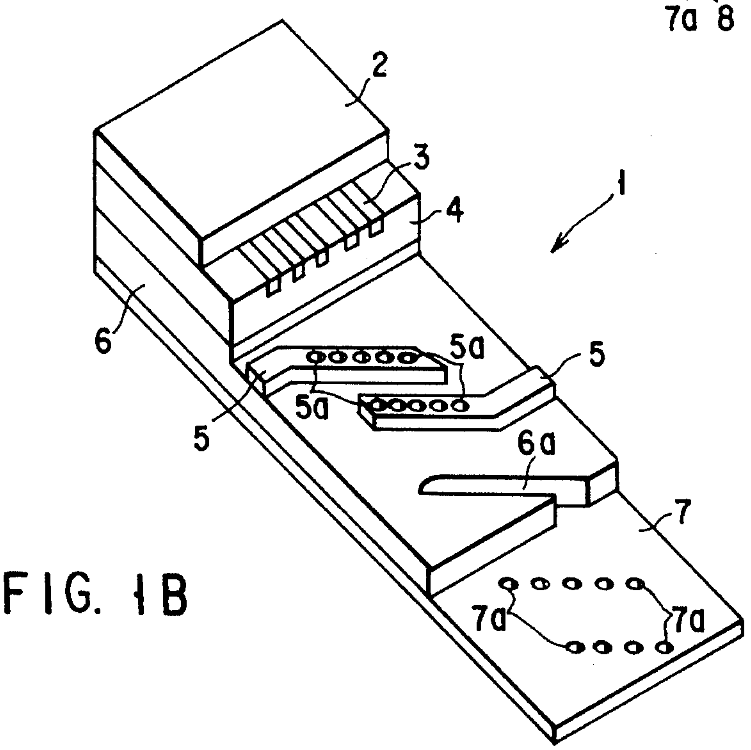
FIG. 1B is a sectional perspective view of the ion flow electrostatic recording head shown in FIG. 1A.

A first embodiment of the present invention will now be described, with reference to FIGS. 1A to 3. FIGS. 1A and 1B schematically show a constitution of an ion flow electrostatic recording head 1. In these figures, reference numeral 2 denotes an insulating substrate of the head 1.

A plurality of first electrodes 3 formed of elongate conductors, which serve as induction electrodes for generating ions, are arranged on the insulating substrate 2. These first electrodes 3 are substantially parallel to one another.

Further, a dielectric layer 4 is formed on the insulating substrate 2 such that the first electrodes 3 are embedded therein. A plurality of second electrodes 5 formed of elongate conductors, serving as discharging electrodes, are fixed on that surface of the dielectric layer 4 which is opposite to the insulating substrate 2. The second electrodes 5 are arranged so as to intersect the first electrodes 3. The first and second electrodes thus form a matrix. Openings **5*a* for generating ions are formed in those portions of the second electrodes 5 which intersect the first electrodes 3**. The first and second electrodes are constituted by a thermosetting member obtained by heating and hardening conductive paste.

An insulating layer 6 is formed on the surface of the dielectric layer 4 such that the second electrodes 5 are embedded therein, and has openings **6*a* communicating with the openings 5*a* of the second electrodes 5**.

Furthermore, a sheet-like third electrode 7 is formed on the surface of the insulating layer 6, and has openings **7*a* communicating with the openings 5*a* and 6*a*. These openings 5*a*, 6*a* and 7*a* serve as ion current flowing openings 8 of the ion flow electrostatic recording head 1**.

When the head 1 is driven, any one of the intersections of the first and second electrodes 3 and 5 is selected in response to a printing signal, and an alternating voltage is applied to the selected intersection between them. Thus, positive and negative ions are generated in vicinity of the opening **5*a* corresponding to the selected intersection, and then a bias voltage is applied between the second electrode 5 and the third electrode 7**. Some of the positive and negative ions, which depend upon the polarity of the bias voltage, are extracted.

The extracted ions pass through the corresponding openings **6*a* and 7*a*, and are supplied to a dielectric drum (member to be charged), which is not shown. Thus, the dielectric drum is charged locally. Consequently, a dot latent image can be formed on the dielectric drum by selectively driving the first and second electrodes 3 and 5**.

A method for manufacturing the ion flow electrostatic recording head 1 shown in FIGS. 1A and 1B, will now be described in detail.

First the first electrodes 3 are formed on the insulating substrate 2. The substrate 2 is, for example, a sheet-like 96% alumina glazed substrate having a thickness of 100 μm used for an hybrid IC. The surface of the substrate is coated with noncrystalline glass.

The first electrodes 3 are constituted by a thermosetting member obtained by heating and hardening conductive paste, e.g., SILVER-PLATINUM CONDUCTIVE PASTE TR-3913 (Trademark) of Tanaka Precious Metal International Co. Ltd.

To constitute the first electrodes 3, conductive paste is printed on one surface of the insulating substrate 2 in a predetermined pattern, using a 200-mesh screen plate on which an emulsion of 12 μm is formed. After that, the conductive paste is leveled at a room temperature for ten minutes and then dried at 120° C. for ten minutes. The temperature of the conductive paste is increased up to 850° C. in five minutes, and the temperature of 850° C. is kept for ten minutes and then decreased, thereby forming the first electrodes 3 each having a thickness of 9 μm.

Figure 2:
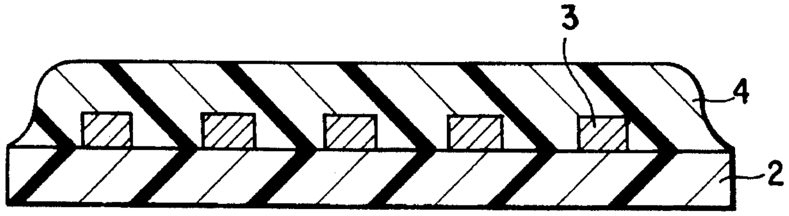
FIG. 2 is a vertical sectional view of the main part of the head which shows a dielectric layer formed on an insulating substrate and first electrodes.
Figure 3:
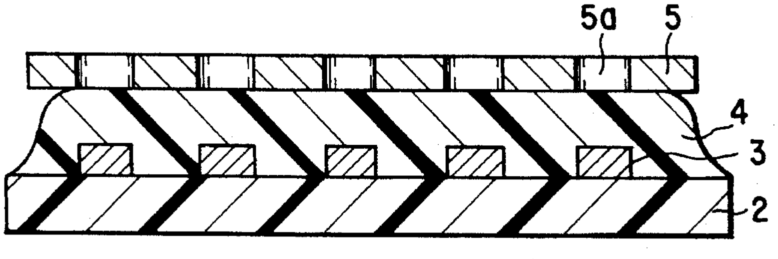
FIG. 3 is a vertical sectional view of the main part of the head which shows second electrodes fixedly adhered to the dielectric layer.

After the first electrodes 3 are formed on the insulating substrate 2, as shown in FIG. 2, the dielectric layer 4 is formed between the first electrodes 3 and on the surfaces thereof. To form the dielectric layer 4, dielectric paste formed of noncrystalline ceramic binder, e.g., PLS-3123 (Trademark) of Nippon Electric Glass Co., Ltd. is applied to the insulating substrate 2.

After the dielectric paste applied to the insulating substrate 2 is dried at a temperature of 150° C. for ten minutes, its temperature is increased to 520° C. at the rate of 30° C./min. The dielectric paste is held in this state for five minutes and then its temperature is decreased at the rate of 50° C./min to harden and burn the paste, with the result that the dielectric layer 4 having a thickness of 33 μm is formed on the first electrodes 3.

The second electrodes 5 are fixedly adhered to the surface of the dielectric layer 4. Like the first electrodes 3, the second electrodes 5 are constituted by a thermosetting member obtained by heating and hardening conductive paste, e.g., SILVER-PLATINUM CONDUCTIVE PASTE TR-3913 (Trademark) of Tanaka Precious Metal International Co., Ltd.

To constitute the second electrodes 5, the conductive paste is printed on the surface of the dielectric layer 4 in predetermined electrode patterns (for the second electrodes 5 and openings 5*a*), using a 400-mesh screen plate fabricated by emulsion. The openings 5*a* of the electrode patterns are positioned so as to coincide with the first electrodes 3. The printed conductive paste is hardened under the same conditions as those for forming the first electrodes 3, thereby forming the second electrodes 5 each having a thickness of 9 μm.

Subsequently, a photosensitive insulating film (solder resist) is vacuum-laminated on the multilayer structure of insulating substrate 2, first electrodes 3, dielectric layer 4, and second electrodes 5 to form an insulating layer 6. Like a normal photosensitive film, photoetching such as exposure and development is applied to the insulating film thereby to form the ion current flowing openings 6*a* communicating with the openings 5*a* of the second electrodes 5.

The third electrode 7 of stainless foil having a thickness of about 30 μm in which openings 7*a* are formed to communicate with the second electrodes 5*a*, is adhered to the insulating layer 6 by, e.g., an adhesive. The third electrode 7 is positioned such that its openings 7*a* communicate with the openings 5*a* of the second electrodes 5, thus completing the ion flow electrostatic recording head 1. The insulating layer 6 and third electrode 7 can be adhered to each other by a tackiness agent, or a pressure sensitive adhesive double-coated tape. Otherwise, the third electrode 7 can be fixed to the insulating layer 6 by an adhesive single-coated tape.

In the ion flow electrostatic recording head having the above structure, the first and second electrodes 3 and 5 are constituted by the thermosetting member. Therefore, the first electrodes 3 can be adhered to the insulating substrate 2 at the same time when the first electrodes 3 are formed, and the second electrodes 5 can be adhered to the dielectric layer 4 at the same time when the second electrodes 5 are formed.

The first electrodes 3 and insulating substrate 2 can be adhered without using any special adhesive, so can be the second electrodes 5 and dielectric layer 4. Unlike the conventional recording head, there is no fear that an adhesive remains in the openings 5*a* of the second electrodes 5, a metal surface is exposed in the vicinity of the openings 5*a* facing the first electrodes 3 when the adhesive in the openings 5*a* is cleaned and removed, or the current densities contributing to discharge vary from opening 5*a* to opening 5*a*.

Since, furthermore, the electrodes can be adhered more firmly than using the conventional silicone type pressure sensitive adhesive, the first and second electrodes 3 and 5 can be prevented from being shifted even though the thermal or mechanical stress is applied to the fixing portions of the electrodes in the process of manufacturing the recording head 1 or the recording head 1 deteriorates with age. As a result, the amount of ions discharged from the openings 5*a* can be uniformed, accordingly, the quality of images formed by the recording head 1 can be heightened and the durability of the recording head 1 can be improved.

Furthermore, the conductive paste is screen-printed on the surface of the dielectric layer 4 and then heated and hardened to form the second electrodes 5 and their openings 5*a*. The recording head of the present invention can thus be manufactured at lower cost than in the case where the second electrodes and the openings are formed on the stainless foil with high precision by the etching technique.

The present invention is not limited to the above embodiment. According to a first modification to the first embodiment, when the second electrodes 5 are formed on the surface of the dielectric layer 4 of the ion flow electrostatic recording head 1, GOLD RESINATE PASTE D-20 (Trademark) of Noritake Co., Ltd. can be used as conductive paste. The conductive paste of the first modification is screen-printed on the surface of the dielectric layer 4 as in the case of the first embodiment. In the hardening and burning steps, the temperature of the conductive paste is increased to 600° C. in five minutes, and this temperature is kept for five minutes and decreased to the room temperature in ten minutes. The thickness of each of the second electrodes 5 formed through the hardening and burning steps is 0.3 μm. In the first modification, the same advantage as that of the first embodiment can be obtained, and the second electrodes 5 can be patterned finely by using the resinate conductive paste.

According to a second modification to the first embodiment, when the second electrodes 5 are formed on the surface of the dielectric layer 4 of the ion flow electrostatic recording head 1, SHINTRON K-3424 (Trademark) of Shinto Chemitron Co., Ltd, which is silver-epoxy conductive paste, can be used as conductive paste. The conductive paste of the second modification is screen-printed on the surface of the dielectric layer 4, as in the case of the first embodiment. The conductive paste is then hardened at a low temperature of 150° C. for a short time of 60 minutes. The thickness of each of the second electrodes 5 formed by hardening the conductive paste is 15 μm. The second modification has the same advantage as that of the first embodiment.

The dielectric layer 4 of the ion flow electrostatic recording head 1 can be formed by applying paste obtained by dispersing dielectric powders, e.g., inorganic powders having a high dielectric constant in an organic polymer containing a solvent or in a ceramic binder, to the insulating substrate 2, and by drying and hardening the paste. Titanium oxide, barium titanate, lead zirconate, or the like can be used as the dielectric powders of the dielectric layer 4. Moreover, resin containing elements such as thermosetting alkyd resin and epoxy resin which are dissolved into an organic solvent, can be used as the organic polymer, and a low melting point glass can be used as the ceramic binder.

The second electrodes 5 are formed on the dielectric layer 4 by the screen printing of the conductive paste. However, they can be formed by applying the conductive paste to the layer 4 by using a transfer technique and, in this case, the conductive paste is heated and hardened after the solvent is dried and removed. Furthermore, a single powder of carbon black, silver, copper, nickel or the like, or a mixed powder thereof, which is dispersed in resin such as epoxy resin and acrylic resin as a conductive filler, and conductive paste containing an organometallic compound such as resinate paste and metal organic deposition paste, can be used as the conductive paste. If, however, the resinate paste or metal organic deposition paste is used, its thermosetting temperature is 500° C. or more, which is higher than that of the normal conductive paste. Thus, a glass substrate or a ceramic substrate such as alumina has to be used as the insulating substrate 2, and ceramic having a high refractory has to be used for the dielectric layer 4.

FIGS. 4A to 4D are directed to a second embodiment of the present invention and show a process of forming a multilayer structure in which a plurality of first electrodes 3 and a dielectric layer 4 are formed on an insulating substrate 2, and a plurality of second electrodes 5 are formed on the dielectric layer by plating.

A method for manufacturing an ion flow electrostatic recording head 1 according to the second embodiment will now be described in detail.

First, the first electrodes 3 are formed on the insulating substrate 2. This substrate 2 is 96% alumina glazed substrate used for an hybrid IC, which has a surface coated with noncrystalline glass and has a thickness of, e.g., 100 μm. A circuit pattern for the first electrodes 3 having a thickness of 9 μm is formed on the insulating substrate 2, as described below.

To form the first electrode 3, high conductive paste, for example, TR-3913 (Trademark) of Tanaka Precious Metal International Co., Ltd. is printed on the insulating substrate 2 in a predetermined pattern, using a 200-mesh screen plate on which emulsion of 12 μm is formed. The conductive paste is leveled at a room temperature for ten minutes and then dried at 120° C. for ten minutes. After that, the temperature of the conductive paste is increased up to 850° C. in five minutes and the temperature of 850° C. is kept for ten minutes. The temperature is decreased thereby to form the first electrodes 3 each having a thickness of 9 μm.

Figure 4A:
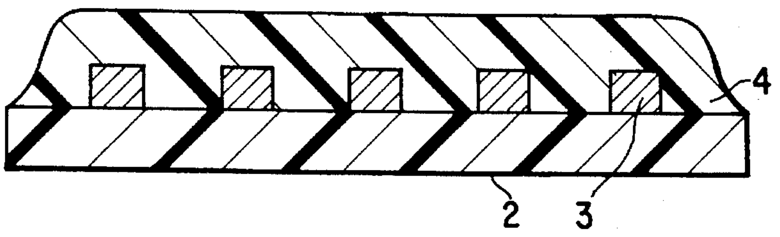
FIG. 4A is a vertical sectional view of the main part of an ion flow electrostatic recording head which is to be manufactured by a method according to a second embodiment of the present invention, in which a dielectric layer is formed on an insulating substrate and first electrodes.

The dielectric layer 4 is formed on the first electrodes 3 and on the insulating substrate 2 between the first electrodes 3. In order to form the dielectric layer 4, dielectric paste of noncrystalline ceramic binder, e.g., PLS-3123 (Trademark) of Nippon Electric Glass Co., Ltd. is applied to the insulating substrate 2 between the first electrodes 3 and to the first electrodes 3 by the screen printing. The dielectric paste is dried at 150° C. for ten minutes and its temperature is increased to 520° C. at a rate of 30° C./min. After the temperature of 520° C. is kept for five minutes, it is decreased at a rate of 50° C./min to burn and harden the dielectric paste, with the result that the dielectric layer 4 having a thickness of 33 μm is formed on the insulating substrate 2 and on the first electrodes 3, as shown in FIG. 4A.

Subsequently, an electrode plate for the second electrodes 5 is formed on the dielectric layer 4 by the following step. First the surface of the dielectric layer 4 is activated, and a paste masking material is applied to that portion of the dielectric layer 4 where no patterns of the second electrodes 5 are to be formed, by the screen printing. As the masking material, for example, paste obtained by dispersing noncrystalline polyolefin resin (90 wt %) and fine powder silica (10 wt %) in toluene, is used.

Figure 4B:
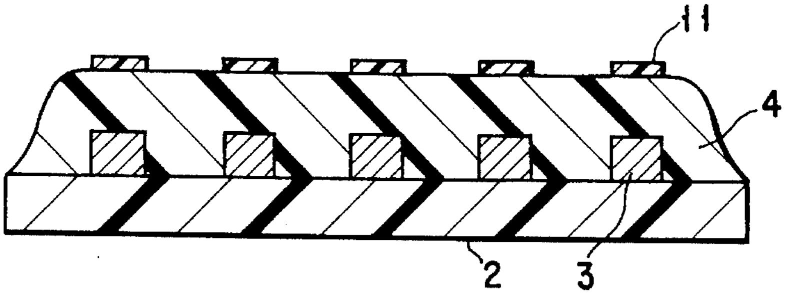
FIG. 4B is a vertical sectional view of the main part of the head which shows masking portions on the dielectric layer.
Figure 4C:
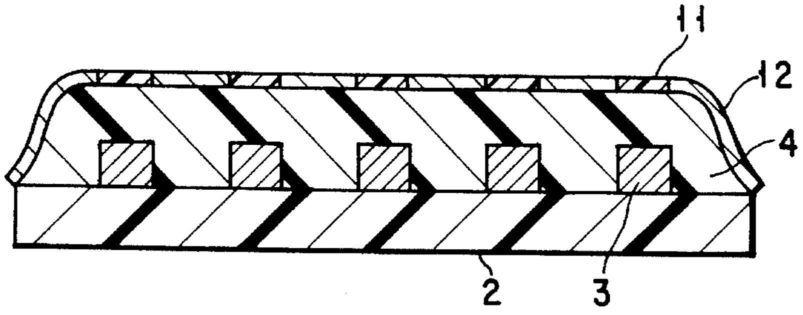
FIG. 4C is a vertical sectional view of the main part of the head which shows the adsorption of colloid.
Figure 4D:
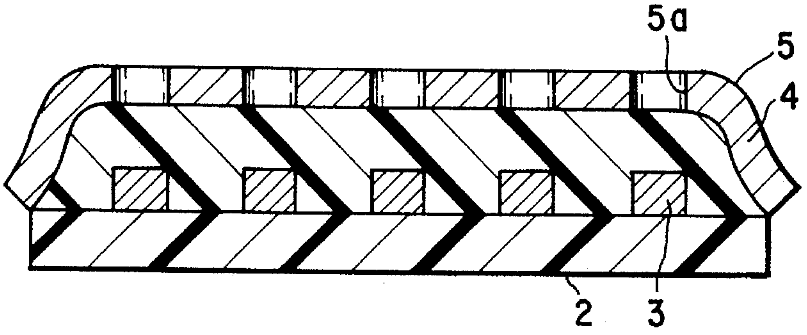
FIG. 4D is a vertical sectional view of the main part of the head which shows second electrodes formed on the dielectric layer.

The masking material applied to the dielectric layer 4 is dried and, as shown in FIG. 4B, masking portions 11 where no conductive films are to be formed are formed on the surface of the layer 4. The multilayer structure is then soaked in a mixed colloid aqueous solution (on sale) of stannous chloride and palladium chloride and, as shown in FIG. 4C, colloid 12 is attached to that surface of the dielectric layer 4 which is other than the masking portions 11. After that, the tin included in the colloid 12 is removed by acid, and the resin forming the masking portions 11 is eliminated in the toluene. Thus only a conductive film which corresponds to the pattern of the electrode plate for the second electrodes 5 remains on the surface of the dielectric layer 4 (conductive film forming step).

If the colloid 12 is attached to the masking portions 11, a difference in level between the masking portions 11 and the other portions is great. Therefore, no continuous film is formed, and unnecessary colloid 12 as well as the masking portions 11 can easily be removed.

The multilayer structure is soaked in a nickel chemical plating bath of 30° C. for ten minutes and then soaked in a electroless gold plating bath of 60° C. for three hours (plating step). The multilayer structure is then washed and dried, thereby forming the second electrodes 5 each having a thickness of 6 μm on the conductive film formed by the colloid 12.

Subsequently, photosensitive insulating films (solder resist) are vacuum-laminated on the insulating substrate 2, second electrodes 5, and the dielectric layer 4 in the openings 5*a* to form an insulating layer 6. Like the normal photosensitive film, the insulating layer 6 is then subjected to photoetching such as exposure and development to form ion current flowing openings 6*a* communicating with the openings 5*a* of the second electrodes 5.

A third electrode 7, which is formed of stainless foil having a thickness of about 30 μm and having openings 7*a* communicating with the openings 5*a*, is adhered to the insulating layer 6. The third electrode 7 and the insulating layer 6 are adhered by positioning the openings 6*a* and 7*a*. By doing so, the ion flow electrostatic recording head 1 is completed. The insulating layer 6 and the third electrode 7 are adhered to each other by a tackiness agent or an adhesive double-coated tape or an adhesive single-coated tape.

In the ion flow electrostatic recording head 1 having the above structure, the conductive film of colloid 12 is formed on the dielectric layer 4 and the second electrodes 5 are formed on the conductive film by the nickel chemical plating and electroless gold plating. Therefore, the second electrodes 2 and the dielectric layer 4 can be adhered firmly without using any adhesive. For this reason, the finished ion flow electrostatic recording head 1 is capable of sufficiently withstanding the tensile shearing force exerted between the second electrodes 5 and the dielectric layer 4 and heat generated when the head is used, and preventing the first and second electrodes 3 and 5 from being shifted in position and thus preventing a variation in amounts of ions generated from the openings 5*a* of the second electrodes 5, with the result that a high-quality image can be formed, and the durability of the head can be improved.

Since no adhesive is applied between the second electrodes 5 and the dielectric layer 4, no adhesive remains in the openings 5*a* of the second electrodes 5 or no metal surface is exposed to those surfaces of the second electrodes 5 which are near the openings 5*a* and face the first electrodes 3 when the adhesive in the openings 5*a* is cleaned and removed.

If, furthermore, plating is formed on the conductive film having a predetermined pattern corresponding to the second electrodes 5 in order to form the second electrodes 5, a metallic material need not be etched. Therefore, a material for the second electrodes is not limited but a metallic material such as precious metal which is very resistant to acid and corrosiveness can be used to form the second electrodes 5.

Figure 5A:
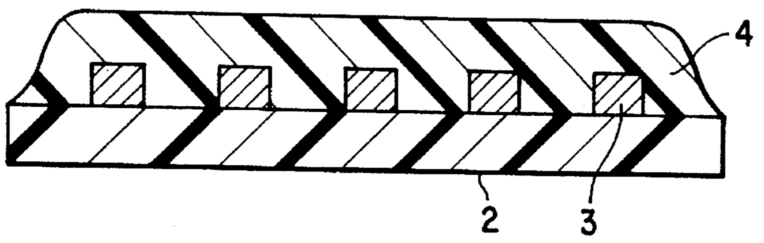
FIG. 5A is a vertical sectional view of the main part of an ion flow electrostatic recording head which is to be manufactured by a method according to a third embodiment of the present invention, in which a dielectric layer is formed on an insulating substrate and first electrodes.
Figure 5B:
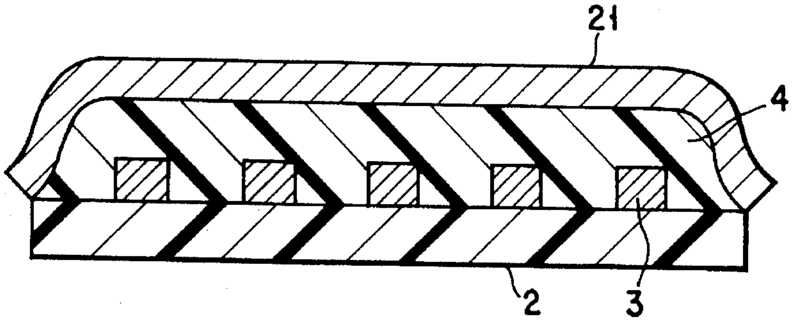
FIG. 5B is a vertical sectional view of the main part of the head which shows a nickel layer formed on the entire surface of the dielectric layer.
Figure 5C:
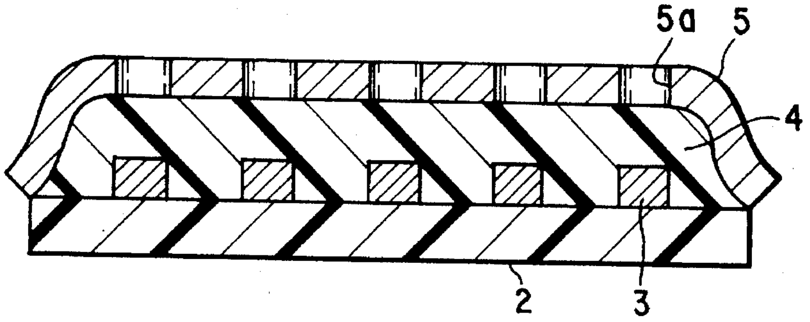
FIG. 5C is a vertical sectional view of the main part of the head which shows second electrodes formed by photoetching.

The present invention is not limited to the above embodiment. FIGS. 5A to 5C show steps of manufacturing an ion flow electrostatic recording head according to a third embodiment of the present invention. For example, the electrode plate for the second electrodes 5 can be formed on the surface of the dielectric layer 4 after the steps shown in FIGS. 5A to 5C.

First, as shown in FIG. 5A, a multilayer structure including an insulating substrate 2 and first electrodes 3 and dielectric layer 4 both formed on the insulating substrate 2 is soaked in a mixed colloid aqueous solution (on sale) of stannous chloride and palladium chloride, while the surface of the dielectric layer 4 is not masked (the entire surface thereof is exposed).

The mixed colloid is attached to the entire surface of the dielectric layer 4 (the colloid is adsorbed into the entire surface of the dielectric layer) and the tin contained in the colloid is eliminated. After that, electroless nickel plating is applied to a conductive film of the colloid as in the case of the first embodiment, and then electric nickel plating is applied thereto, with the result that a nickel layer 21 for the second electrodes 5 is formed on the whole surface of the dielectric layer 4, as shown in FIG. 5B.

Subsequently, a predetermined opening pattern of second electrodes 5 is formed in the nickel layer 21 by photoetching as shown in FIG. 5C, and gold plating is applied to the opening pattern by electrical pure gold plating, thereby forming second electrodes each having a thickness of 10 μm.

In the third embodiment, the second electrodes 5, which are relatively thick and rigid, can be firmly adhered to the dielectric layer 4 without using any adhesive, and thus the same advantage as that of the first embodiment can be obtained.

In the second embodiment, when the second electrodes 5 are formed, gold plating can be applied to the electroless nickel layer by electrical plating, instead of applying the electroless gold plating to the electroless nickel plating. In this case, since the second electrodes 5, which are relatively thick and rigid, can be firmly adhered to the dielectric layer 4 without using any adhesive, the same advantage as that of the first embodiment can be obtained.

The dielectric layer 4 of the present invention is formed by applying paste, which is obtained by dispersing dielectric powder, e.g., inorganic powder having a high dielectric constant in organic polymer containing a solvent or in a ceramic binder, to the insulating substrate 2, and by drying and hardening the paste. Titanium oxide, barium titanate, lead zirconate, or the like can be used as the dielectric powder.

Moreover, resin containing elements such as thermosetting alkyd resin and epoxy resin which are dissolved into an organic solvent, can be used as the organic polymer, and a low melting point glass, water glass, or the like can be used as the ceramic binder.

The operation of forming the second electrodes 5 on the dielectric layer 4 can be performed by the same method as that of the second embodiment. For example, a conductive film such as ITO (Indium-Tin Oxide) is formed on the entire surface of the dielectric layer 4 by dipping or spraying, a conductive metal film is formed thereon by electroless plating and electrolytic plating, either alone or in combination, and a predetermined pattern is formed therefrom by photoetching. A material capable of forming the pattern by photoetching is required for the plating, therefore, precious metal which is very resistant to acid and corrosiveness should not be used as deposition metal.

Furthermore, a conductive film such as ITO can be formed on the dielectric layer 4 so as to have a predetermined pattern by dipping or spraying by using the same method as that of the second embodiment, and then electroless plating or electrolytic plating can be applied to the conductive film, thereby forming the second electrodes 5. In this case, various types of metal can be used for the electroless plating or electrolytic plating.

It is needless to say that various changes and modifications can be made without departing from the scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for manufacturing an ion flow electrostatic recording head including: a plurality of first electrodes extending in parallel to one another on an insulating substrate; a plurality of second electrodes intersecting said plurality of first electrodes to form a matrix and having openings at positions corresponding to intersections of said plurality of first electrodes and said plurality of second electrodes, on the matrix; and a dielectric layer interposed between said plurality of first electrodes and said plurality of second electrodes, said plurality of first electrodes and said plurality of second electrodes jointly constituting ion generating portions arranged in a matrix pattern; said method comprising the steps of:

(a) forming a conductive film on the dielectric layer which together with said first plurality of electrodes constitutes a multilayer structure on the insulating substrate; and (b) applying a plating to said conductive film to form said plurality of second electrodes, said applying of the plating including a first step of applying a chemical plating to the conductive film and a second step of applying an electroless plating thereto.

2. The method of claim 1, wherein said insulating substrate is a 96% alumina glazed substrate having a thickness of 100 μm covered with a noncrystalline glass; and said conductive film is formed by adsorbing a conductive colloid solution into an entire surface of the dielectric layer of the multilayer structure.

3. The method of claim 1, wherein said first electrodes have a thickness of 9 μm.

4. The method of claim 1, wherein said dielectric layer is formed from a dielectric paste of a noncrystalline ceramic binder; and said conductive film is formed by adsorbing a conductive colloid solution into an entire surface of the dielectric layer of the multilayer structure.

5. The method of claim 4, wherein said dielectric layer has a thickness of 33 μm.

6. The method of claim 1, wherein the chemical plating is a nickel plating.

7. The method of claim 1, wherein the dielectric layer comprises an inorganic provider selected from the group consisting of titanium oxide, barium titanate and lead zirconate in a resin selected from the group consisting of a thermosetting alkyd resin and an epoxy resin, containing a solvent.

8. The method of claim 1, wherein the dielectric material comprises an inorganic powder selected from the group consisting of titanium oxide, barium titanate and lead zirconate in a ceramic binder selected from the group consisting of a low melting point glass and a water glass.

9. A method for manufacturing an ion flow electrostatic recording head including: a plurality of first electrodes extended in parallel to one another on an insulating substrate; a plurality of second electrodes intersecting said plurality of first electrodes to form a matrix and having openings at positions corresponding to intersections of the matrix; and a dielectric layer interposed between said plurality of first electrodes and said plurality of second electrodes, wherein said plurality of first electrodes and said plurality of second electrodes jointly constituting ion generating portions arranged in matrix pattern, said method comprising the steps of:

(a) forming a conductive film on said dielectric layer, said conductive film-forming step including a step of immersing, in a conductive colloid solution, a multilayer structure comprising said plurality of first electrodes and said dielectric layer, and a step of adsorbing said colloid into an entire surface of the dielectric layer of the multilayer structure;

(b) forming a predetermined opening pattern corresponding to said plurality of second electrodes on a plating portion of said conductive film by photoetching; and (c) applying a plating to the plating portion except at regions where the opening pattern is formed, thereby forming said plurality of second electrodes.

10. The method of claim 9, wherein the dielectric layer comprises an inorganic provider selected from the group consisting of titanium oxide, barium titanate and lead zirconate in a resin selected from the group consisting of a thermosetting alkyd resin and an epoxy resin, containing a solvent.

11. The method of claim 9, wherein the dielectric layer comprises an inorganic provider selected from the group consisting of titanium oxide, barium titanate and lead zirconate in a resin selected from the group consisting of a thermosetting alkyd resin and an epoxy resin, containing a solvent.

12. The method of claim 9, wherein the conductive colloid solution is an aqueous solution of stannous chloride and palladium chloride.

13. The method of claim 12, wherein the plating is a nickel plating.

* * * * *